US012585051B2

(12) United States Patent
Hyodo et al.

(10) Patent No.: US 12,585,051 B2
(45) Date of Patent: Mar. 24, 2026

(54) ADJUSTMENT DEVICE AND OPTICAL COMMUNICATION DEVICE

(71) Applicant: Tamron Co., Ltd., Saitama (JP)

(72) Inventors: Masamitsu Hyodo, Saitama (JP);
Yusuke Hashimoto, Saitama (JP)

(73) Assignee: Tamron Co., Ltd., Saitama (JP)

( * ) Notice: Subject to any disclaimer, the term of this patent is extended or adjusted under 35 U.S.C. 154(b) by 315 days.

(21) Appl. No.: 18/125,516

(22) Filed: Mar. 23, 2023

(65) Prior Publication Data

US 2023/0333292 A1     Oct. 19, 2023

(30) Foreign Application Priority Data

Apr. 15, 2022     (JP) ................................. 2022-067862

(51) Int. Cl.
*G02B 5/04* (2006.01)
*H04B 10/11* (2013.01)
(52) U.S. Cl.
CPC ................ *G02B 5/04* (2013.01); *H04B 10/11* (2013.01)
(58) Field of Classification Search
None
See application file for complete search history.

(56) References Cited

U.S. PATENT DOCUMENTS

| | | | |
|---|---|---|---|
| 2004/0070820 A1* | 4/2004 | Nishimura ........... | B23K 26/067 359/359 |
| 2006/0280421 A1* | 12/2006 | Tanaka ................... | G02B 26/02 385/140 |
| 2009/0067051 A1* | 3/2009 | Cho ................... | G02B 26/0883 359/554 |
| 2020/0220956 A1* | 7/2020 | Fujisaki ................. | H04N 23/57 |
| 2025/0076549 A1* | 3/2025 | Fuse ..................... | G02B 5/045 |

OTHER PUBLICATIONS

Matsumoto, Problems and Future Vision of Optical Wireless Communication, Mar. 17, 2016, pp. 1-41, Waseda University Matsumoto Mitsuji Laboratory Optical & Wireless Lab.

* cited by examiner

*Primary Examiner* — Ryan Crockett
(74) *Attorney, Agent, or Firm* — Paratus Law Group, PLLC

(57) ABSTRACT

An optical communication device includes an adjustment device and a light receiving unit. The adjustment device includes a wedge prism, an actuator, a detection unit, and a control unit, and the control unit controls the actuator to reduce a difference between a result of detection by the detection unit and a reference.

13 Claims, 11 Drawing Sheets

*FIG. 3*
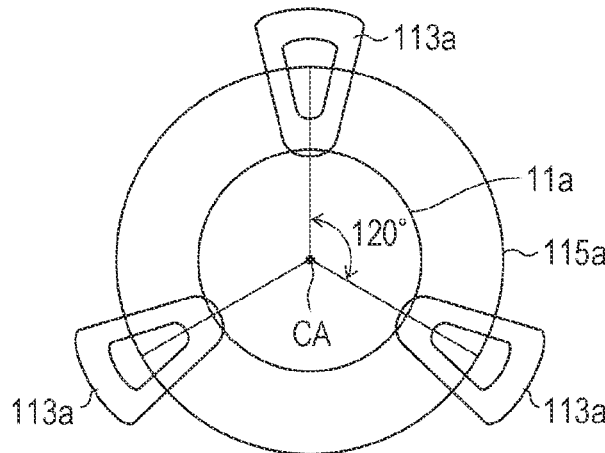
*FIG. 4*
POWER SUPPLY
HALL ELEMENT
TARGET ROTATION ANGLE
CURRENT ANGLE    OUTPUT PWM
13
113a
GND
*FIG. 5*
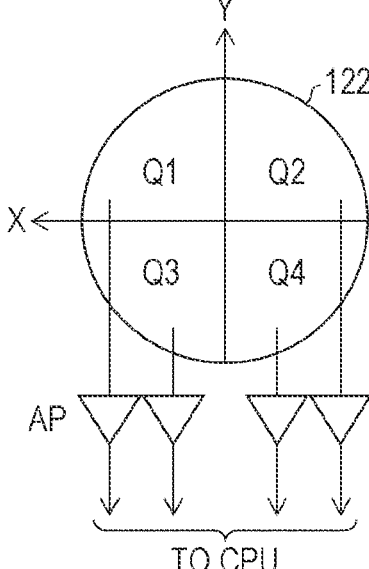
Y
122
Q1    Q2
X
Q3    Q4
AP
TO CPU

START

INPUT OUTPUT VALUE OF PHOTODIODE — S101

CALCULATE DISPLACEMENT AMOUNTS
IN EACH OF X-AXIS AND Y-AXIS DIRECTIONS — S102

ΔX, ΔY

CALCULATE ROTATION AMOUNT OF WEDGE PRISM
CORRESPONDING TO X AXIS OR Y AXIS — S103

ΘX, ΘY

PERFORM PID PROCESSING
WITH TARGET VALUES ΘX AND ΘY — S104

X-AXIS WEDGE PRISM          Y-AXIS WEDGE PRISM

ADJUSTMENT DEVICE AND OPTICAL COMMUNICATION DEVICE

CROSS-REFERENCE TO RELATED APPLICATIONS

This application is based on and claims the benefit of priority from Japanese Patent Application No. 2022-067862, filed on Apr. 15, 2022, the entire contents of which are incorporated herein by reference.

BACKGROUND OF THE INVENTION

Technical Field

The present invention relates to an adjustment device and an optical communication device.

Related Art

In optical communication, it is preferable to reduce the number of intermediate devices for transmission to a destination of signal light from the viewpoint of improvement in efficiency. For this purpose, higher accuracy in transmission and reception of signal light is required. From such a viewpoint, there has been known an optical communication device that adjusts an angle of a mirror disposed on an optical path of signal light to reduce a difference between a traveling direction of the signal light from the branched signal light and a reference direction (for example, see Mitsuji Matsumoto, "Problems and Future Vision of Optical Wireless Communication", [online], Mar. 17, 2016, [searched on Apr. 6, 2022], Internet <https://www.ieice.org/~wbs/pdf/taikai_matsumoto.pdf>).

According to the above-described conventional art, a traveling direction of signal light can be controlled at a high speed and with high accuracy, but size reduction is difficult because an optical design for adjusting the traveling direction of the signal light is required, and a space for arranging a mirror and a mechanism for driving the mirror is also required.

One object of an aspect of the present invention is to provide a technology capable of controlling a traveling direction of signal light at a high speed and with high accuracy, while being advantageous in size reduction.

SUMMARY OF THE INVENTION

An adjustment device according to an aspect of the present invention includes: a wedge prism rotatably disposed on an optical path of signal light; an actuator that rotates the wedge prism; a detection unit that detects a position of the signal light before being transmitted through the wedge prism or after being transmitted through the wedge prism, the detection unit detecting a difference between a reference position set in the detection unit and the position of the signal light; and a control unit that controls the actuator to reduce the difference detected by the detection unit.

An optical communication device according to an aspect of the present invention includes: the above-described adjustment device; and a light receiving unit that receives the signal light or a light emitting unit that emits the signal light, wherein the wedge prism is disposed on the optical path of the signal light.

According to one aspect of the present invention, it is possible to realize an adjustment device and an optical communication device capable of controlling a traveling direction of signal light at a high speed and with high accuracy, while being advantageous in size reduction.

BRIEF DESCRIPTION OF THE DRAWINGS

FIG. 3 is a diagram schematically illustrating an example in which a plurality of coils are arranged to correspond to wedge prisms according to the first embodiment of the present invention;

FIG. 4 is a diagram for explaining control for energizing the coil according to the first embodiment of the present invention;

FIG. 5 is a diagram for explaining a four-split photodiode and its output according to the first embodiment of the present invention;

DESCRIPTION OF THE EMBODIMENTS

First Embodiment

[Configuration]

Figure 1:
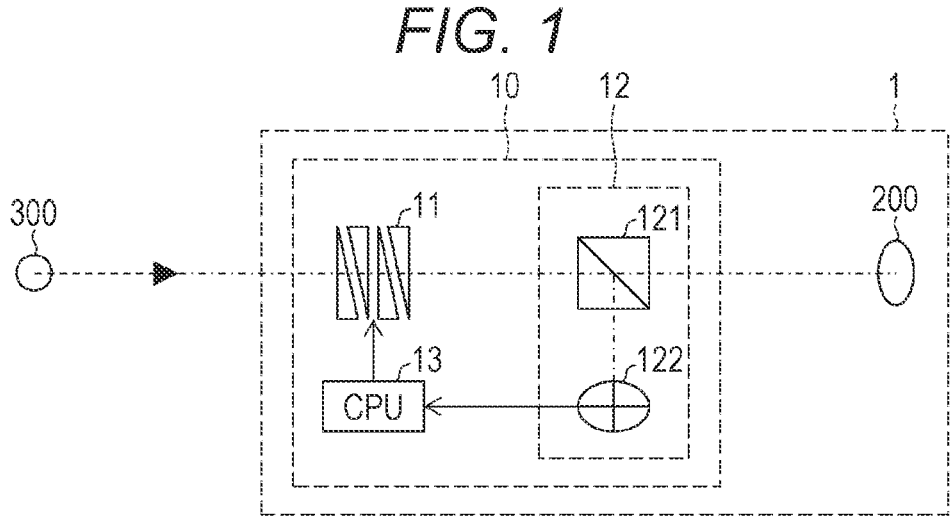
FIG. 1 is a diagram schematically illustrating a functional configuration of an optical communication device according to a first embodiment of the present invention.

Hereinafter, an embodiment of the present invention will be described in detail. FIG. 1 is a diagram schematically illustrating a functional configuration of an optical communication device according to a first embodiment of the present invention. As illustrated in FIG. 1, the optical communication device 1 includes an adjustment device 10 and a light receiving unit 200. The light receiving unit 200 is a device capable of receiving signal light in optical communication, converting the signal light into an electric signal if necessary, and transmitting the electric signal, and is, for example, a condenser lens, a photodiode, or a complementary metal oxide semiconductor (CMOS) image sensor. Note that the signal light is emitted from a light emitting unit 300. The light emitting unit 300 is an element that converts electricity into light, and is, for example, a light emitting diode or a semiconductor laser.

The adjustment device 10 includes wedge prisms 11 rotatably disposed on an optical path of signal light, a detection unit 12 that detects a difference between a position of the signal light after being transmitted through the wedge prisms and a reference position of the signal light, and a control unit 13 that controls the actuator to reduce the difference detected by the detection unit 12. The control unit 13 is, for example, a central processing unit (CPU).

Further, the adjustment device 10 includes an actuator that rotates the wedge prisms 11. The wedge prisms 11 are two pairs of (four) wedge prisms, and each pair of (two) wedge prisms control a component in a specific direction (e.g., an X-axis direction or a Y-axis direction on a plane orthogonal to a reference direction) in a traveling direction of the signal light. Hereinafter, the wedge prisms 11 and the actuator will be described in more detail.

Figure 2:
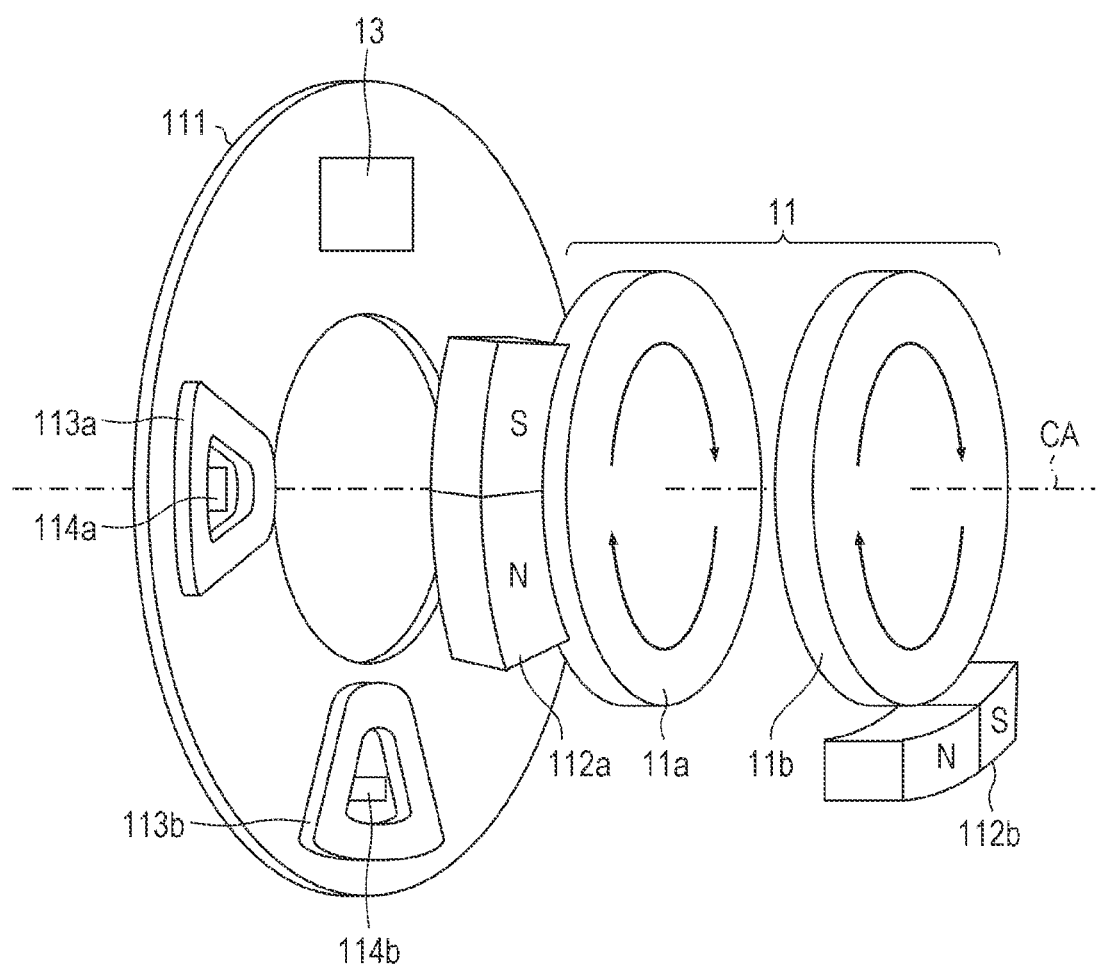
FIG. 2 is a diagram schematically illustrating a functional configuration of an actuator according to the first embodiment of the present invention.

FIG. 2 is a diagram schematically illustrating a functional configuration of the actuator according to the first embodiment of the present invention. FIG. 2 schematically illustrates a configuration in which one pair of wedge prisms 11 are rotated. In FIG. 2, one of the one pair of wedge prisms is a first wedge prism 11a, and the other one of the one pair of wedge prisms is a second wedge prism 11b. The first wedge prism 11a and the second wedge prism 11b are provided side by side with a common rotation axis CA.

The adjustment device 10 includes a substrate 111, a first magnet 112a, and a second magnet 112b. The first magnet 112a is disposed to correspond to the first wedge prism 11a, and the second magnet 112b is disposed to correspond to the second wedge prism 11b. A first coil 113a, a second coil 113b, a first hall element 114a, and a second hall element 114b are disposed on the substrate 111. The first magnet 112a is disposed to pass over the first coil 113a by the rotation of the first wedge prism 11a. The second magnet 112b is disposed to pass over the second coil 113b by the rotation of the second wedge prism 11b. The control unit 13 is disposed on the substrate 111.

FIG. 3 is a diagram schematically illustrating an example in which a plurality of coils are arranged to correspond to the wedge prisms according to the first embodiment of the present invention. Each wedge prism 11 is fitted to and supported by a rotatably disposed frame 115a. The first wedge prism 11a is supported by the frame 115a, and the first magnet 112a is also supported by the frame 115a.

In the present embodiment, three first coils 113a and three first hall elements 114a are arranged. As illustrated in FIG. 3, each of the first coils 113a is disposed at a three-fold rotational symmetry position with the rotation axis CA as the center of rotation in plan view. Each of the first coils 113a is constituted by a conductive wire wound in a substantially fan shape in plan view. In this manner, the first coil 113a includes a portion extending in a direction intersecting both the rotation direction of the first wedge prism 11a and a direction of a magnetic field to be described below.

The first hall element 114a is disposed on a side of the first coil 113a opposite to the first magnet 112a in a direction along the rotation axis CA, and is disposed inside the substantially fan-shaped first coil 113a in plan view. The first hall element 114a is an element that outputs a voltage force corresponding to a magnetic field (a magnetic field in a direction along the rotation axis CA of the first wedge prism 11a) formed between the first magnet 112a corresponding to the first coil 113a and a yoke to be described below. The first hall element 114a is connected to the control unit 13. Furthermore, the yoke is disposed on a main surface of the substrate 111 opposite to the first coil 113a.

The first coil 113a and the first magnet 112a constitute a voice coil motor that rotates the first wedge prism 11a by energizing the first coil 113a. By energizing the first coil 113a, thrust for rotating the first wedge prism 11a is generated in a direction orthogonal to a radial direction of the fan shape, that is, in a direction substantially along the rotation direction of the first wedge prism 11a.

In addition, by energizing the first coil 113a, the first hall element 114a outputs a voltage corresponding to a magnetic field (a magnetic flux density). A rotation angle of the first wedge prism 11a can be approximated to a voltage value (magnetic flux density) detected by the first hall element 114a in a specific range by a linear expression. The control unit 13 acquires the rotation angle of the first wedge prism 11a based on such a correlation.

In addition, three first coils 113a are arranged at three-fold rotational symmetry positions with respect to the first wedge prism 11a. The first wedge prism 11a rotates in a balanced and smooth manner by rotational thrust from the plurality of first coils 113a. Therefore, an occurrence of a rotation defect of the first wedge prism 11a due to the bias of the first coil 113a is suppressed, and an occurrence of a blur of signal light due to the defect is suppressed. Further, displacement of the first wedge prism 11a in the thrust direction due to concentration of the magnetic field is suppressed.

FIG. 4 is a diagram for explaining the control for energizing the coil according to the first embodiment of the present invention. As illustrated in FIG. 4, the hall element outputs a voltage corresponding to a magnetic field (a magnetic flux density). The control unit 13 acquires the rotation angle (a current angle) of the wedge prism according to the voltage output from the hall element. The control unit 13 controls the rotation of the wedge prism, which is rotated by the voice coil motor, according to the acquired current angle, such that the rotation angle of the wedge prism becomes a target rotation angle.

The second coil 113b is configured similarly to the first coil 113a to operate similarly to the first coil 113a.

The detection unit 12 includes a branching unit 121 that is disposed on an optical path of the signal light to branch the signal light, and a split photodiode 122 that receives the light (also referred to as "branched light") branched from the signal light. The branching unit 121 is, for example, a cube-type beam splitter, and branches the signal light in a direction orthogonal to the traveling direction of the signal light.

FIG. 5 is a diagram for explaining a four-split photodiode and its output according to the first embodiment of the present invention. The split photodiode 122 is a four-split photodiode, and has a light receiving surface having a circular planar shape. The light receiving surface is equally divided into four sections by two straight lines orthogonal to each other. The split photodiode 122 is configured to be able to detect intensities Q1 to Q4 of irradiation light components in the divided sections, respectively. The split photodiode 122 is connected to the control unit 13, and is configured so that each of the intensities Q1 to Q4 detected in each section is input to the control unit 13.

Note that the split photodiode 122 can be replaced with another device capable of detecting an irradiation position of the received light. For example, an image sensor can be used as the light receiving unit for receiving the branched light.

[Control of Traveling Direction of Signal Light]

Figure 6:
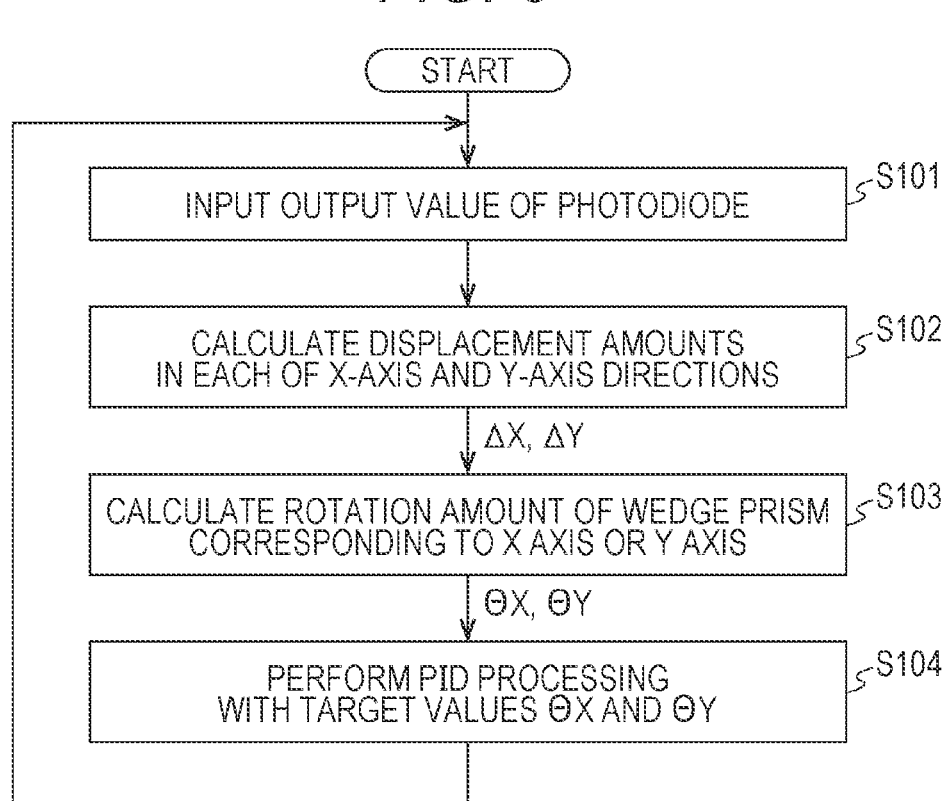
FIG. 6 is a flowchart illustrating an example of a flow of a process of acquiring a rotation angle of the wedge prism from a detection result of a detection unit according to the first embodiment of the present invention.

The adjustment device 10 causes the branching unit 121 to branch the signal light on the optical path, reads an irradiation position of the branched signal light in the split photodiode 122, and rotates the wedge prism 11 according to the data to deflect the signal light toward the light receiving unit 200. FIG. 6 is a flowchart illustrating an example of a flow of a process of acquiring a rotation angle of the wedge prism from a detection result of the detection unit according to the first embodiment of the present invention.

In the present embodiment, a photodiode is used to detect an amount of a blur occurring in the photodiode of a component of light branched from signal light (branched light). When a relative positional relationship between the adjustment device 10 and the signal light changes, for example, when the optical communication device 1 tilts or the signal light vibrates, an incident angle or an incident position of the signal light onto the wedge prism 11 may change, and an irradiation position of the signal light in the light receiving unit 200 may change (blur) out of and deviate from a specific range. The "blur" refers to a change in irradiation position of the signal light or the branched light. When the signal light is located in a specific range in a central portion of the light receiving unit 200, the branched light is located in the central portion of the split photodiode 122. In this case, the intensities Q1 to Q4 in the respective sections of the split photodiode 122 are all detected as numerical values within the specific range. As described above, the irradiation position of the split light in the split photodiode 122 corresponds to the irradiation position of the signal light in the light receiving unit 200. That is, detection unit 12 detects a difference between the reference position of the signal light set in the detection unit 12 and the irradiation position of the signal light in the detection unit 12. This difference can also be said to be a deviated amount of the irradiation position of the signal light in the detection unit 12 with respect to the position within the above-described specific range set in the detection unit 12.

The "reference position" is a position used as a reference of an irradiation position of signal light, and is, for example, a certain position within the specific range of the central portion of the light receiving unit 200 or the split photodiode 122 (e.g., the center of the light receiving surface of the light receiving unit 200 or the split photodiode 122). Examples of the case where the irradiation position of the signal light (or the split light) deviates from the reference position include the case where the optical communication device 1 tilts and the case where the signal light vibrates as described above.

For example, when the optical communication device 1 tilts, the incident angle of the signal light changes. In this case, the traveling direction of the signal light deviates from the reference direction. The "reference direction" is a traveling direction used as a reference of signal light, and is, for example, a virtual traveling direction of the signal light to the reference position. In addition, for example, when the optical communication device 1 vibrates, the incident position of the signal light changes. In this case, the irradiation position of the signal light deviates from the reference position. In either case, the difference between the irradiation position of the signal light in the detection unit 12 and the reference position can be further reduced by adjusting the rotation angle of the wedge prism. When the traveling direction of the signal light is detected, the detection unit may detect a difference between the traveling direction of the signal light and the reference direction. Also in this case, the difference between the irradiation position of the signal light in the light receiving unit 200 and the reference position is detected.

In step S101, the control unit 13 acquires output values Q1 to Q4 from the split photodiode 122.

A position of a branched light component in the split photodiode 122 changes to correspond to a deviation in position of the signal light in the light receiving unit 200.

In step S102, the control unit 13 acquires displacement amounts in each of the X-axis direction and the Y-axis direction of the signal light according to the acquired output values Q1 to Q4. In the four-split photodiode, the displacement amount $\Delta x$ in the X-axis direction and the displacement amount $\Delta y$ in the Y-axis direction are obtained from the following formulas.

$$\Delta x = (Q1 + Q3) - (Q2 + Q4)$$

$$\Delta y = (Q1 + Q2) - (Q3 + Q4)$$

In step S103, the control unit 13 calculates a rotation angle of the wedge prism 11 corresponding to the X axis or the Y axis. For example, based on a correlation between the position of the signal light in the light receiving unit 200 and the position of the split light in the split photodiode 122, the control unit 13 acquires a rotation amount of the wedge prism from $\Delta x$ and $\Delta y$ in the split photodiode 122.

Figure 7:
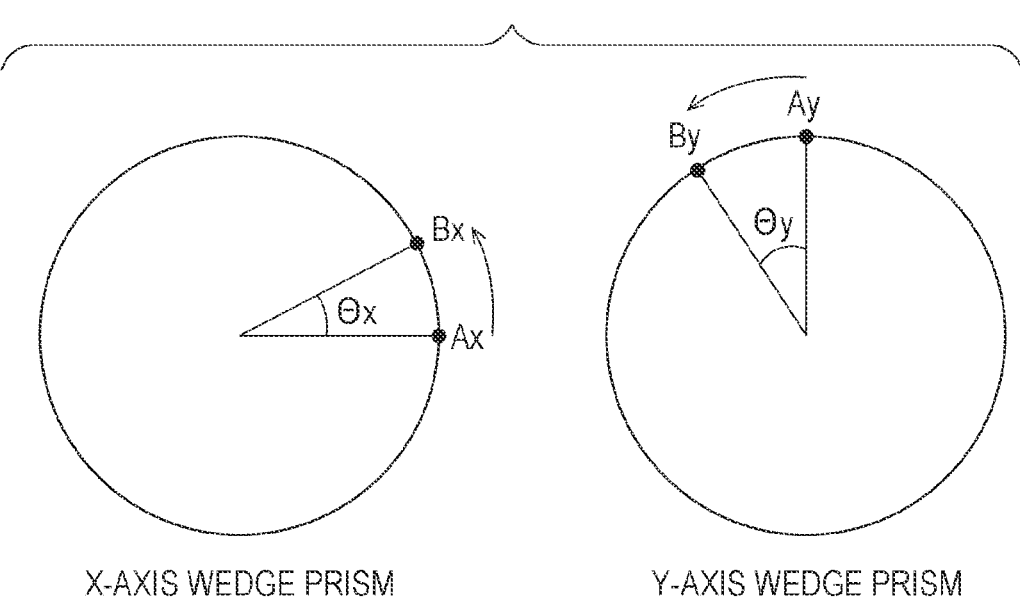
FIG. 7 is a diagram for explaining a position and a rotation angle in a rotation direction of the wedge prism according to the first embodiment of the present invention.

FIG. 7 is a diagram for explaining a position and a rotation angle in a rotation direction of the wedge prism according to the first embodiment of the present invention. The rotation angle (rotation amount) $\theta x$ of the wedge prism 11 corresponding to the X axis is obtained from $\Delta x$, and the rotation angle $\theta y$ of the wedge prism 11 corresponding to the Y axis is obtained from $\Delta y$.

θx is a difference between Ax and Bx in FIG. 7, and θy is a difference between Ay and By. Each of Ax and Ay is an angle of a center position of the split photodiode 122, for example, an angle of 0 degrees (an initial position or a reference position). Each of Bx and By is a correction rotation angle for correcting a blur of signal light, and is a target value, for example, in PID control.

The target value may be a value that reduces the difference detected by the detection unit. In a case where an actuator capable of rotating the wedge prism 11 at a speed sufficiently faster than a blurred speed of the signal light is used, it is possible to repeatedly correct the blurred signal light toward the specific range of the light receiving unit 200 by feedback control and to keep the signal light within the specific range. The control of the rotation angle of the wedge prism 11 can be realized by, for example, control similar to an adjustment of an angle of a mirror in a conventional optical communication device. The target value may be a value smaller than or equal to the difference between the traveling direction of the signal light and the reference direction, or may be a value smaller than or equal to the difference between the irradiation position of the signal light and the reference position. In this manner, the control unit 13 calculates a correction amount of the wedge prism for correcting the blur appearing in the light receiving unit 200.

In step S104, the control unit 13 controls an energization amount of the voice coil motor to realize the rotation angle obtained in step S103, for example, by PID processing. In this manner, the control unit 13 controls the actuator so that the difference detected by the detection unit becomes small. As described above, the signal light is branched at the branching unit 121. Therefore, the control of the control unit 13 locates the signal light within the specific range of the light receiving unit 200, and moves the position of the light branched from signal light toward the central portion of the split photodiode 122 (Q1 to Q4 become substantially equivalent to each other). As described above, the position of the signal light in the light receiving unit 200 is reflected in the position of the branched light in the split photodiode 122.

The control unit 13 repeatedly executes steps S101 to S104 at least during optical communication. Even if the signal light is blurred by high-speed and fine vibration, when the signal light deviates from the reference direction or the reference position, the wedge prism 11 rotates to a rotation angle that eliminates the deviation. As described above, in the present embodiment, by performing the above-described process at a high speed, it is possible to reduce a blur amount of the signal light in the light receiving unit 200.

<Main Function and Effect of Present Embodiment>

In the present embodiment, the deflection of the signal light by the wedge prism 11 can correspond to two-dimensional scanning. Therefore, in the present embodiment, even if the blur of the signal light occurs due to vibration caused for multiple reasons (e.g., a case where both the inclination of the optical communication device and the change in irradiation position of the signal light in the wedge prism 11 are included), the irradiation position of the signal light can be changed to a specific correction range on the light receiving surface of the light receiving unit 200 on the basis of the blur amount detected by the split photodiode 122.

In particular, in the present embodiment, since the difference between the irradiation position of the signal light after being transmitted through the wedge prism 11 and the reference position is detected by the detection unit (the branching unit 121 and the split photodiode 122), the irradiation position of the branched light of the corrected signal light is detected by the split photodiode 122. Therefore, since the light subjected to the same control as the signal light in the light receiving unit 200 is detected by the detection unit (the split photodiode 122), the present embodiment is advantageous in that feedback control is accurately and simply performed.

Although the correction of the blur of signal light has been described in the present embodiment, the adjustment device 10 may further perform other deflection control for realizing a desired function of the optical communication device 1, such as adjusting the traveling direction of the signal light for scanning the optical communication device on the reception side (of the beacon).

In the present embodiment, the voice coil motor is employed as an actuator that rotates the wedge prism 11. Therefore, the present embodiment is advantageous in that the wedge prism 11 is rotated to an accurate position at a high speed with a compact and lightweight configuration.

[Aspect of Actuator]

Figure 8:
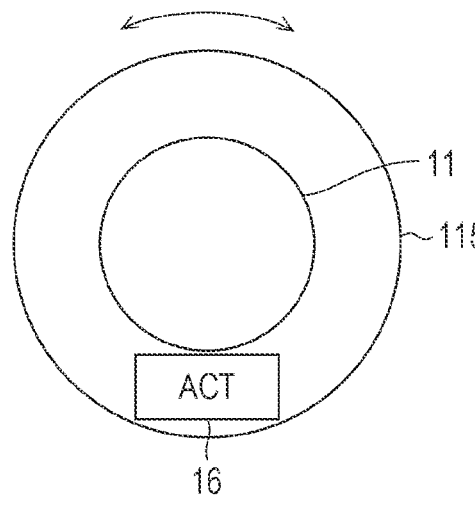
FIG. 8 schematically illustrate a first example in which the actuator is disposed with respect to the wedge prism according to the first embodiment of the present invention.
Figure 9:
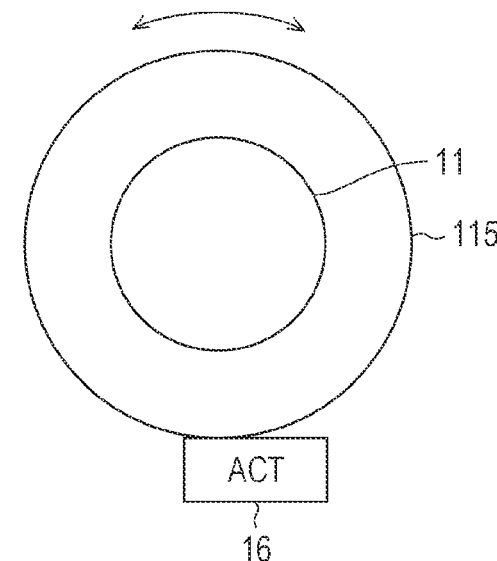
FIG. 9 schematically illustrate a second example in which the actuator is disposed with respect to the wedge prism according to the first embodiment of the present invention.
Figure 10:
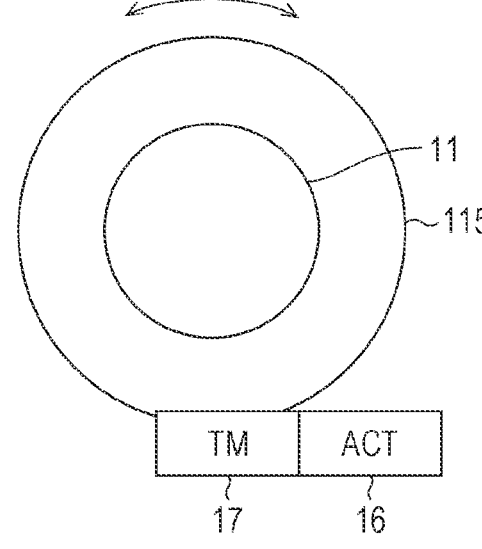
FIG. 10 schematically illustrate a third example in which the actuator is disposed with respect to the wedge prism according to the first embodiment of the present invention.

Note that, in the present embodiment, the type of the actuator and the structure of the actuator can be appropriately selected within a range in which the wedge prism 11 can be rotated at a sufficiently high speed and with high accuracy to correct the blur of the signal light. FIGS. 8 to 10 schematically illustrate first to third examples, respectively, in which the actuator is disposed with respect to the wedge prism according to the first embodiment of the present invention.

For example, as illustrated in FIG. 8, the actuator 16 according to the present embodiment may be an integrated planar actuator integrally mounted on the wedge prism 11 to directly drive the wedge prism 11 and having a substantially planar shape. Such an actuator is generally lightweight, space-saving, and in directly driving type, and thus can be disposed integrally with the wedge prism disposed in parallel on the optical path, and is suitable in that a rotational motion of the wedge prism is realized at a high speed and with high accuracy. Examples of such an actuator 16 include a voice coil motor and a piezo actuator.

Furthermore, as illustrated in FIG. 9, for example, the actuator 16 according to the present embodiment may be an external actuator disposed outside the wedge prism 11 and directly rotating the wedge prism 11. The external actuator is disposed, for example, on the substrate rotatably supporting the wedge prism 11. The external actuator is usually disposed in contact with the wedge prism 11 or a support member (e.g., the frame 115a) integrated therewith to transmit a driving force, but may be disposed in a non-contact manner as long as the driving force can be transmitted. The external actuator is generally less restrictive in size of installation space than the aforementioned integrated planar actuator, and is suitable when an actuator having a larger output is provided. In addition, the external actuator is advantageous when rotating a large number of wedge prisms 11 or a heavier wedge prism 11 at a high speed and with high accuracy. Examples of such a direct driving type external actuator include a voice coil motor, a piezo motor, a brushless direct current (BLDC) motor, a stepping motor, and a direct current (DC) motor.

Furthermore, the actuator 16 according to the present embodiment may further include a transmission mechanism 17 in addition to the above-described external actuator, for example, as illustrated in FIG. 10. Such a drive transmission type external actuator is also advantageous from the same viewpoint as the above-described external actuator. Examples of the transmission mechanism 17 include a gear, a link mechanism, and a crank mechanism. The external actuator and the transmission mechanism 17 may be arranged in contact with each other or may be arranged in a non-contact manner as long as a driving force can be transmitted.

Second to Ninth Embodiments

Other embodiments of the present invention will be described below. In the following embodiments, for convenience of description, members having the same functions as those described in the above embodiment will be denoted by the same reference signs, and the description thereof will not be repeated.

Second Embodiment

Figure 11:
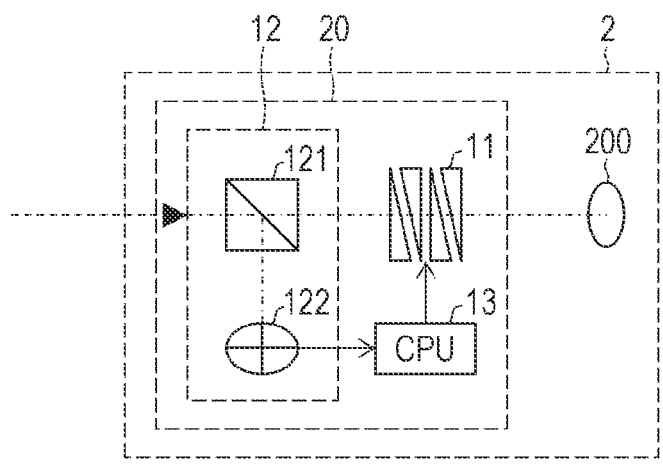
FIG. 11 is a diagram schematically illustrating a functional configuration of an optical communication device according to a second embodiment of the present invention.

FIG. 11 is a diagram schematically illustrating a functional configuration of an optical communication device according to a second embodiment of the present invention. As illustrated in FIG. 11, an optical communication device 2 according to the present embodiment is configured similarly to the optical communication device 1 according to the first embodiment, except that an adjustment device 20 is provided instead of the adjustment device 10. The adjustment device 20 is configured similarly to the adjustment device 10 according to the first embodiment, except that the detection unit 12 is disposed on a side of the wedge prism 11 opposite to the light receiving unit 200.

In the present embodiment, the detection unit detects a difference between the position of the signal light before being transmitted through the wedge prism and the reference position. In the present embodiment, it is possible to correct a blur of signal light in a similar manner to the first embodiment according to a result of detecting branched light not including an influence of deflection by the wedge prism 11.

Third Embodiment

Figure 12:
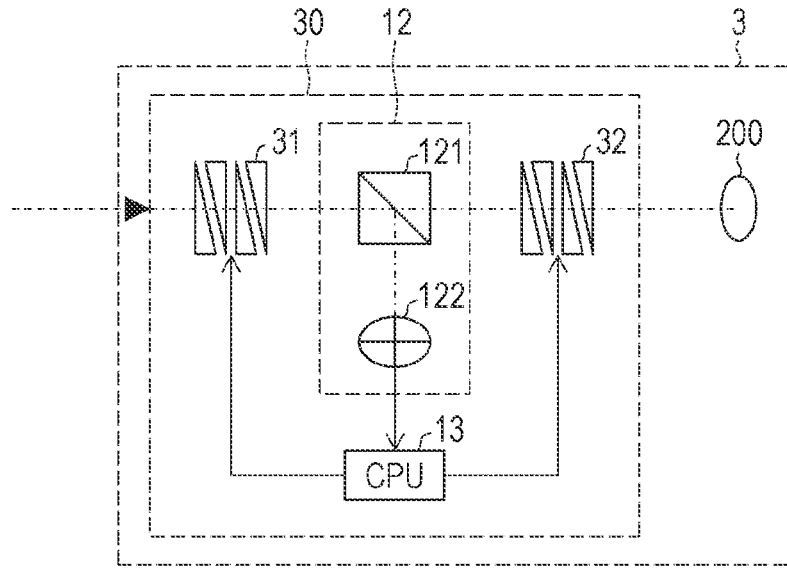
FIG. 12 is a diagram schematically illustrating a functional configuration of an optical communication device according to a third embodiment of the present invention.

FIG. 12 is a diagram schematically illustrating a functional configuration of an optical communication device according to a third embodiment of the present invention. As illustrated in FIG. 12, an optical communication device 3 according to the present embodiment is configured similarly to the optical communication device 1 according to the first embodiment, except that an adjustment device 30 is provided instead of the adjustment device 10. The adjustment device 30 includes two wedge prisms 31 and 32 arranged in series on the optical path of the signal light. Furthermore, in the adjustment device 30, the detection unit 12 is disposed between the two wedge prisms 31 and 32, and the control unit 13 is configured to control each of the two wedge prisms 31 and 32. Otherwise, the adjustment device 30 is configured similarly to the adjustment device 10 according to the first embodiment. Among the wedge prisms 31 and 32, the wedge prism 32 is disposed closer to the light receiving unit 200.

In the present embodiment, the detection unit detects a position of branched light of signal light after being transmitted through the wedge prism 31 and before being transmitted through the wedge prism 32. In the present embodiment, it is possible to further subdivide the function of controlling deflection of signal light in the wedge prisms 31 and 32.

For example, in the present embodiment, a correction of a blur of signal light by PID control may be performed stepwise in each of the wedge prisms 31 and 32. Alternatively, in the present embodiment, control for desired deflection of signal light such as control of deflection for a beacon may be performed by one of the wedge prisms 31 and 32, and a blur of the signal light may be corrected by the other one of the wedge prisms 31 and 32. In a case where a correction of a blur of signal light is performed stepwise in each of the wedge prisms 31 and 32, an influence of a rotation angle by one of the wedge prisms 31 and 32 can be detected by the other one of the wedge prisms 31 and 32. Therefore, the present embodiment is advantageous in that accuracy in setting a value of a rotation angle for bringing an irradiation position of signal light in the light receiving unit 200 near the reference position is further improved.

Fourth and Fifth Embodiments

Figure 13:
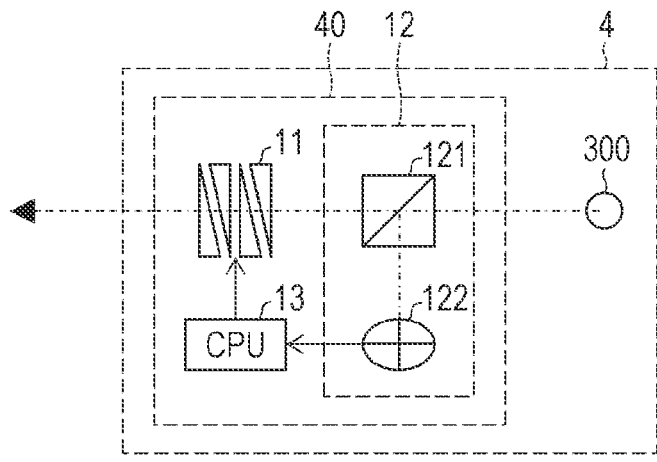
FIG. 13 is a diagram schematically illustrating a functional configuration of an optical communication device according to a fourth embodiment of the present invention.

FIG. 13 is a diagram schematically illustrating a functional configuration of an optical communication device according to a fourth embodiment of the present invention. As illustrated in FIG. 13, an optical communication device 4 according to the fourth embodiment is configured similarly to the optical communication device 1 according to the first embodiment, except that a light emitting unit 300 is provided instead of the light receiving unit 200, and an adjustment device 40 is provided instead of the adjustment device 10. The adjustment device 40 has the same configuration as the adjustment device 10, and in the optical communication device 4, the branching unit 121 is disposed to branch signal light before being transmitted through the wedge prism 11.

Figure 14:
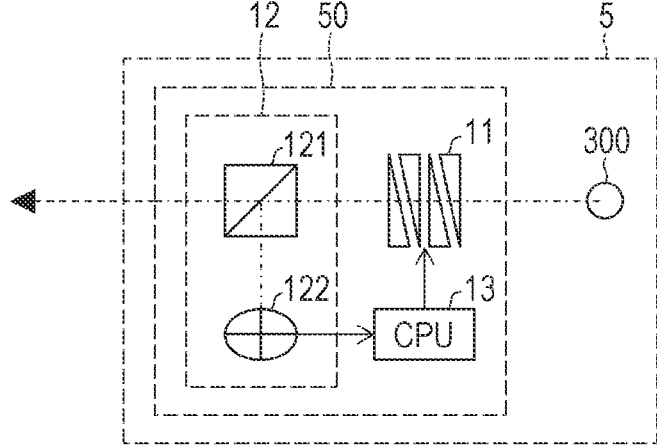
FIG. 14 is a diagram schematically illustrating a functional configuration of an optical communication device according to a fifth embodiment of the present invention.

In addition, FIG. 14 is a diagram schematically illustrating a functional configuration of an optical communication device according to a fifth embodiment of the present invention. As illustrated in FIG. 14, an optical communication device 5 according to the fifth embodiment is configured similarly to the optical communication device 2 according to the second embodiment, except that a light emitting unit 300 is provided instead of the light receiving unit 200, and an adjustment device 50 is provided instead of the adjustment device 20. The adjustment device 50 has the same configuration as the adjustment device 20, and in the optical communication device 5, the branching unit 121 is disposed to branch signal light after being transmitted through the wedge prism 11.

These embodiments are much more effective in detecting the vibration of signal light or the change in traveling direction of signal light due to the looseness of the light emitting unit 300 or the wedge prism 11, and correcting the traveling direction of the signal light.

Sixth Embodiment

Figure 15:
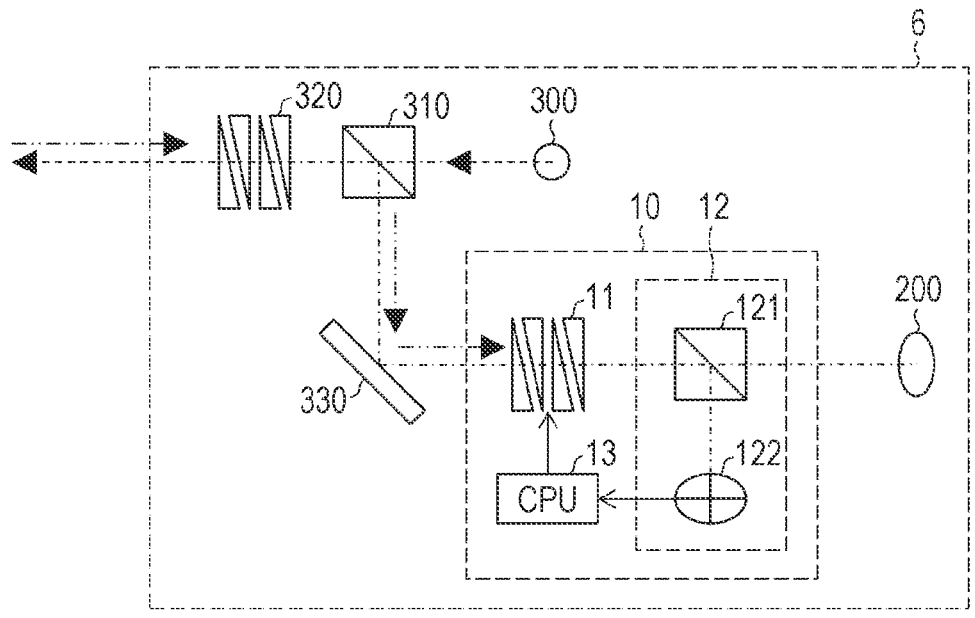
FIG. 15 is a diagram schematically illustrating a functional configuration of an optical communication device according to a sixth embodiment of the present invention.

An optical communication device according to an embodiment of the present invention may include both a transmission-side configuration and a reception-side configuration. FIG. 15 is a diagram schematically illustrating a functional configuration of an optical communication device according to a sixth embodiment of the present invention. As illustrated in FIG. 15, an optical communication device 6 according to the present embodiment has a similar configuration to the optical communication device 1 according to the first embodiment, except that a light emitting unit 300, a branching unit 310, a wedge prism 320, and a reflecting mirror 330 are further included.

The branching unit 310 is disposed between the light emitting unit 300 and the wedge prism 320. The branching unit 310 transmits signal light emitted from the light emitting unit 300 and branches the signal light from the outside transmitted through the wedge prism 320. The wedge prism 320 controls a traveling direction of the signal light (for example, for a beacon) emitted from the light emitting unit 300. When receiving signal light from the outside, the wedge prism 320 transmits the signal light at a specific position (e.g., the above-described reference position). The reflecting mirror 330 reflects the signal light from the outside branched by the branching unit 310 toward the wedge prism 11 (the light receiving unit 200). The reflecting mirror 330 is fixed at a specific position determined by the position of the branching unit 310 and the position of the light receiving unit 200.

In the present embodiment, both emission and reception of signal light can be performed, and as described above, it is possible to correct relative vibration or inclination of the signal light when the signal light is received.

Seventh Embodiment

Figure 16:
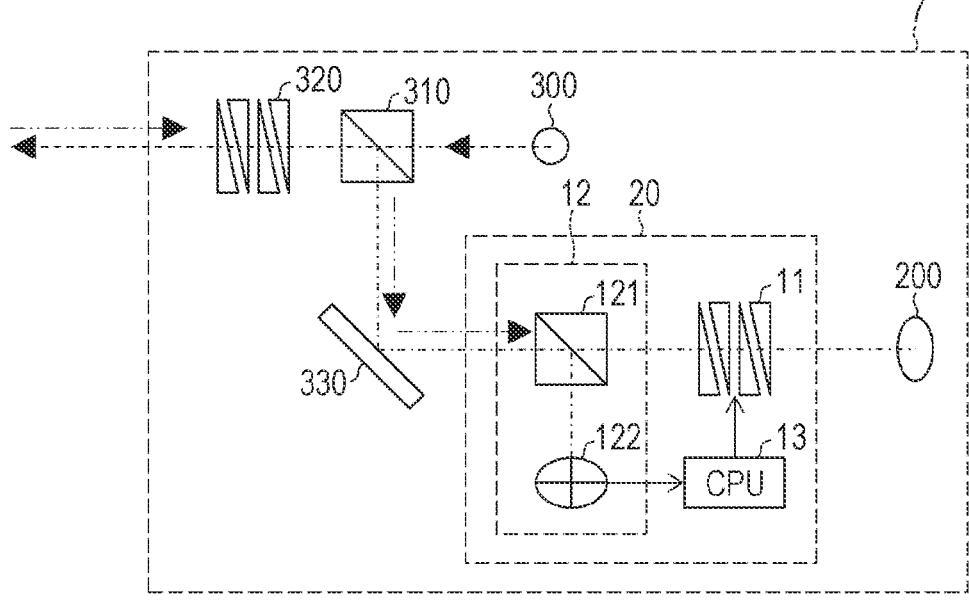
FIG. 16 is a diagram schematically illustrating a functional configuration of an optical communication device according to a seventh embodiment of the present invention.

FIG. 16 is a diagram schematically illustrating a functional configuration of an optical communication device according to a seventh embodiment of the present invention. As illustrated in FIG. 16, an optical communication device 7 according to the present embodiment has a similar configuration to the optical communication device 6 according to the sixth embodiment, except that the adjustment device 20 is provided instead of the adjustment device 10. Also in the present embodiment, similarly to the sixth embodiment described above, both emission and reception of signal light can be performed, and it is possible to correct relative vibration or inclination of the signal light when the signal light is received.

Eighth Embodiment

Figure 17:
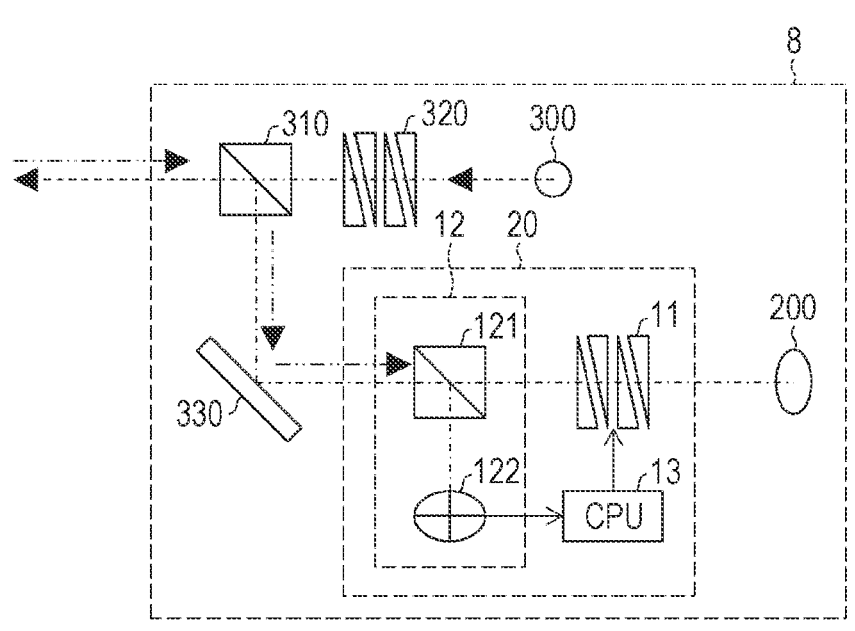
FIG. 17 is a diagram schematically illustrating a functional configuration of an optical communication device according to an eighth embodiment of the present invention.

FIG. 17 is a diagram schematically illustrating a functional configuration of an optical communication device according to an eighth embodiment of the present invention. As illustrated in FIG. 17, an optical communication device 8 according to the present embodiment has a similar configuration to the optical communication device 7 according to the seventh embodiment described above, except that the positions on the optical path of the signal light emitted from the branching unit 310 and the wedge prism 320 are switched.

In the present embodiment, signal light from the outside is branched into the light receiving unit 200 before being transmitted through the wedge prism 320. Therefore, it is possible to simultaneously perform emission of signal light from the light emitting unit 300 of which a traveling direction is controlled by the wedge prism 320 and correction of relative vibration or inclination of signal light received from the outside.

Ninth Embodiment

Figure 18:
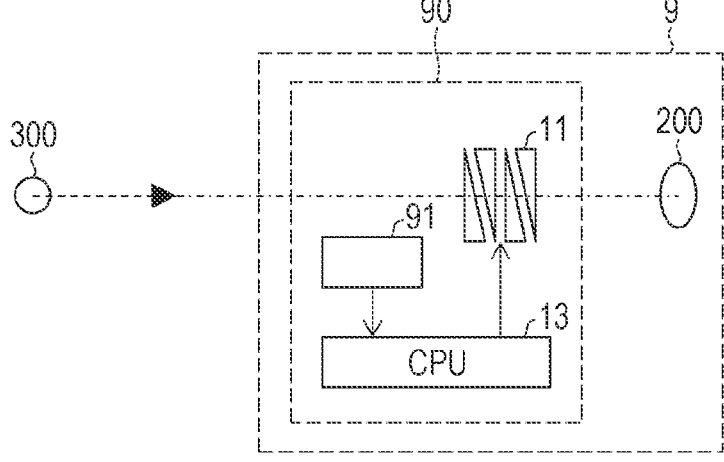
FIG. 18 is a diagram schematically illustrating a functional configuration of an optical communication device according to a ninth embodiment of the present invention.

FIG. 18 is a diagram schematically illustrating a functional configuration of an optical communication device according to a ninth embodiment of the present invention. As illustrated in FIG. 18, an optical communication device 9 according to the present embodiment has a similar configuration to the optical communication device 1 according to the first embodiment described above, except that an adjustment device 90 is provided instead of the adjustment device 10. The adjustment device 90 includes a gyro sensor 91 instead of the detection unit 12. The gyro sensor 91 detects an inclination of the optical communication device 9 holding the wedge prism 11, and outputs a detection signal to the control unit 13. The traveling direction of the signal light in the wedge prism 11 changes due to the inclination of the optical communication device 9, causing a difference between the traveling direction and the reference direction. The gyro sensor 91 is a detection unit that detects a difference between the traveling direction of the signal light before passing through the wedge prism 11 and the reference direction.

According to the present embodiment, the inclination of the optical communication device 9 can be detected by the gyro sensor 91, and the blur of the signal light occurring in the light receiving unit 200 can be corrected by the wedge prism 11. In the present embodiment, the signal light reaches the light receiving unit 200 without being branched. Therefore, as compared with a case where a traveling direction of signal light is corrected on the basis of branched light, the present embodiment is advantageous in that attenuation caused by branching the signal light is prevented.

Note that the adjustment device 90 may further include another sensor, such as the above-described branched light receiving unit, if necessary. By further referring to a value detected by another sensor in this manner, the adjustment device 90 can also realize correction of not only the inclination (tilt) of the signal light but also the deviation (shift) of the irradiation position of the signal light, similarly to the other embodiments described above. Furthermore, similarly to the above-described embodiments, the adjustment device 90 can also be applied to an optical communication device on a signal light transmission side to correct a blur of signal light. Furthermore, similarly to the above-described embodiments, the adjustment device 90 can also be applied to an optical communication device having both a transmission-side configuration and a reception-side configuration, and can correct a blur of signal light in the optical communication device having both a transmission-side configuration and a reception-side configuration.

[Blur of Signal Light Due to Atmospheric Fluctuations]

The atmosphere fluctuates due to natural phenomena such as weather and humidity, thereby generating large and small atmospheric masses. The atmospheric mass exhibits a different refractive index as compared with its surrounding atmosphere. Therefore, the above-described atmospheric fluctuation causes a blur of signal light. A larger atmospheric mass causes vibration of signal light having a larger amplitude and a lower frequency, and a smaller atmospheric mass causes vibration of signal light having a smaller amplitude and a lower frequency. A blur of signal light caused by such an atmospheric mass may occur at a frequency in a range of about 1 Hz to 2 KHz. In optical communication in the atmosphere, it is preferable to appropriately correct a blur of signal light caused by such atmospheric fluctuations.

A blur of signal light caused by large (low-frequency) atmospheric fluctuations can be corrected in a similar manner to the above-described blur of the signal light caused by the vibration of the device. A blur of signal light caused by small (high-frequency) atmospheric fluctuations can be corrected by driving the wedge prism to rotate at a high frequency. Hereinafter, a form suitable for correcting a blur of signal light caused by high-frequency atmospheric fluctuations will be mainly described.

Tenth Embodiment

Figure 19:
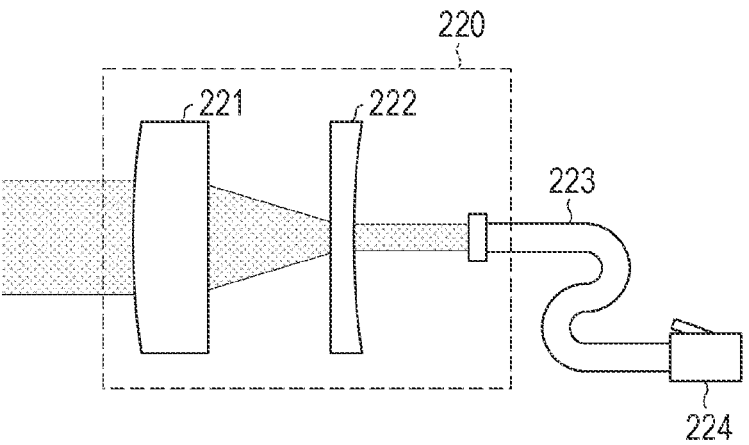
FIG. 19 is a diagram schematically illustrating an optical configuration of a light receiving system of an optical communication device according to a tenth embodiment of the present invention.

FIG. 19 is a diagram schematically illustrating an optical configuration of a light receiving system of an optical communication device according to a tenth embodiment of the present invention. As illustrated in FIG. 19, the light receiving unit 220 includes an antenna 221, an expander 222, and a single mode fiber 223. One end of the single mode fiber 223 is a light receiving end, and the other end of the single mode fiber 223 has a connector 224.

The antenna 221 is an optical element of a condensing system. The antenna 221 is, for example, a condenser lens, and condenses signal light to have a beam diameter such that the signal light can be received by the single mode fiber 223.

The expander 222 emits the signal light condensed by the antenna 221 as collimated light toward the light receiving end of the single mode fiber 223. As the expander 222, for example, a collimator lens is used.

The single mode fiber 223 has a core and a clad. The collimated light as signal light from the expander 222 is guided to the core either directly or via an appropriate connector at one end of the single mode fiber 223.

As described above, the light receiving unit 220 according to the present embodiment includes a single mode fiber 223 that receives signal light and a condensing optical system (an antenna 221 and an expander 222) that condenses the signal light to have a beam diameter such that the signal light is guided to the core of the single mode fiber. The condensing optical system only needs to be disposed in the optical path of the signal light reaching the single mode fiber 223, and does not need to be disposed immediately before the single mode fiber 223 in the optical path of the signal light.

Figure 20:
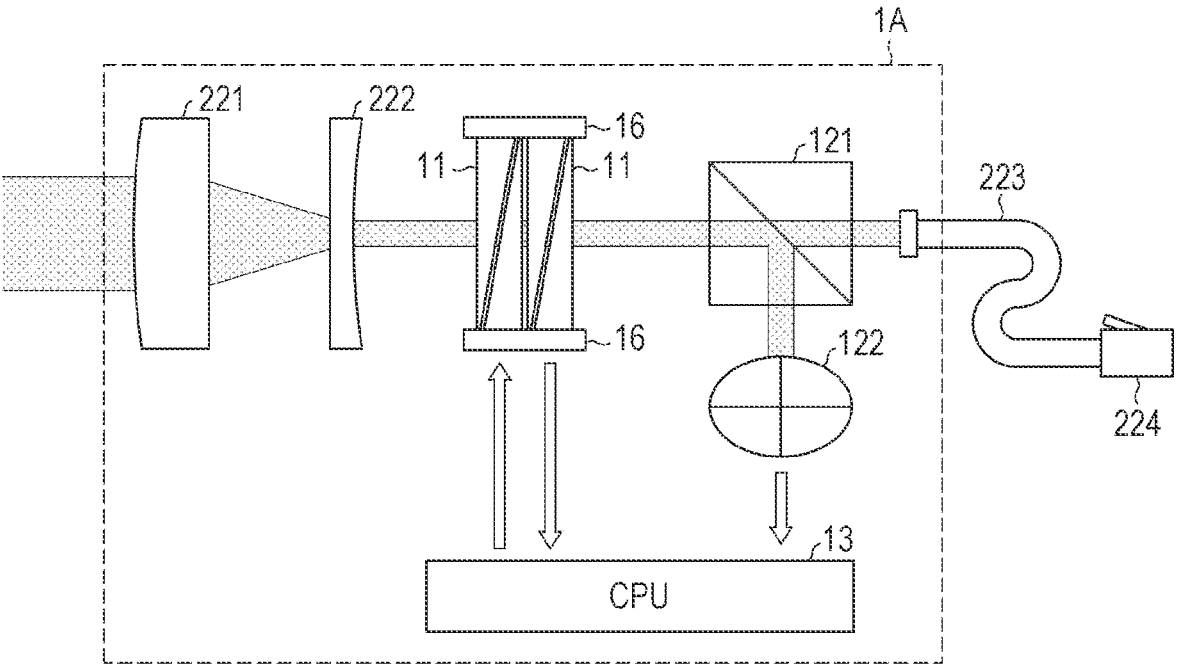
FIG. 20 is a diagram schematically illustrating a functional configuration of the optical communication device according to the tenth embodiment of the present invention.

An example of a configuration of an optical communication device including the light receiving unit will be described. FIG. 20 is a diagram schematically illustrating a functional configuration of an optical communication device according to the tenth embodiment of the present invention. As illustrated in FIG. 20, an optical communication device 1A includes an antenna 221, an expander 222, a wedge prism 11, an actuator 16, a branching unit 121, a split photodiode 122, a control unit 13, a single mode fiber 223, and a connector 224. The antenna 221 and the expander 222 condense signal light to have a beam diameter such that the signal light can be received by the single mode fiber 223, and emit the signal light to the wedge prism 11 as collimated light. The collimated light passes through the branching unit 121 and is received by the single mode fiber 223. The other configurations are the same as those in the first embodiment described above.

In the present embodiment, the single mode fiber 223 directly receives signal light. Therefore, in a case where an image sensor is used as the light receiving unit 200, signal conversion processing is unnecessary. Accordingly, since the delay of the control due to the signal conversion processing does not occur, a load of the control for rotating the wedge prism 11 can be further reduced. Therefore, the present embodiment is more advantageous in that the control for rotating the wedge prism 11 is further speeded up, and a blur of signal light caused by the high-frequency fluctuations described above is suppressed. In addition, since the signal light directly reaches the single mode fiber 223, communication equivalent to general optical fiber communication can be realized in optical communication in space.

Eleventh Embodiment

Figure 21:
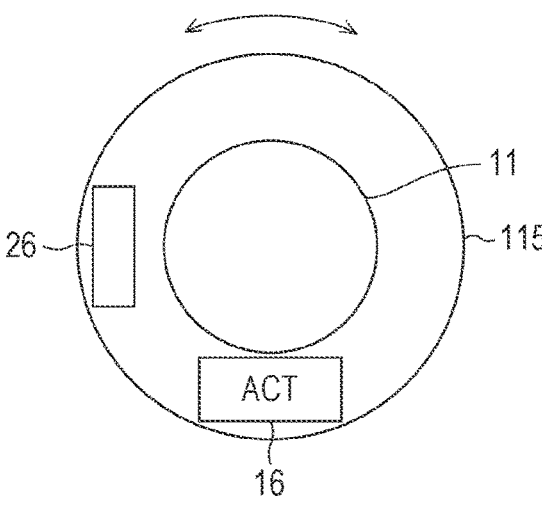
FIG. 21 is a diagram schematically illustrating a torque adjustment mechanism of a wedge prism according to an eleventh embodiment of the present invention.

The present embodiment is similar to the above-described embodiment, except that a torque adjustment device is further included in addition to the actuator that rotates the wedge prism 11. FIG. 21 is a diagram schematically illustrating a torque adjustment mechanism of the wedge prism according to the eleventh embodiment of the present invention. As illustrated in FIG. 21, a torque adjustment device 26 is further attached to the wedge prism 11 in addition to the actuator 16 for rotating the wedge prism 11. The torque adjustment device 26 is a device capable of driving the wedge prism 11 to rotate, similarly to the actuator 16, and can be appropriately selected from the various types of actuators described above in the first embodiment. In order to realize a rotational motion of the wedge prism at a high speed and with high accuracy, it is preferable that the torque adjustment device 26 is a voice coil motor.

In the voice coil motor, a torque and a frequency tend to increase in an approximately proportional relationship up to the vicinity of a specific frequency. Here, the frequency is a reciprocal of a cycle, and the cycle is a time required for one amplitude based on forward rotation and reverse rotation of the wedge prism. As described above, the frequency characteristic of the voice coil motor is generally proportional to the torque and inversely proportional to the amplitude. Therefore, by increasing the torque in the rotational motion of the wedge prism 11, the frequency of the rotational motion can be increased.

One or more torque adjustment devices 26 may be installed for one wedge prism 11, and the upper limit of the number of torque adjustment devices 26 can be appropriately determined within a range in which the frequency improvement effect can be obtained by improving the torque or within a range in which a desired frequency can be realized. When a plurality of torque adjustment devices 26 are installed, this is advantageous in that the balance in the rotation drive mechanism of the wedge prism 11 is improved. From this point of view, it is also an advantageous aspect that the torque adjustment device 26 and the actuator 16 are arranged at substantially rotationally symmetrical positions with respect to the rotation center of the actuator 16.

As described above, in the present embodiment, since the optical communication device further includes a torque adjustment device 26, a rotation frequency of the wedge prism 11 can be further increased. Therefore, the present embodiment is more advantageous in that a blur of signal light caused by the high-frequency fluctuations described above is suppressed.

Twelfth Embodiment

Figure 22:
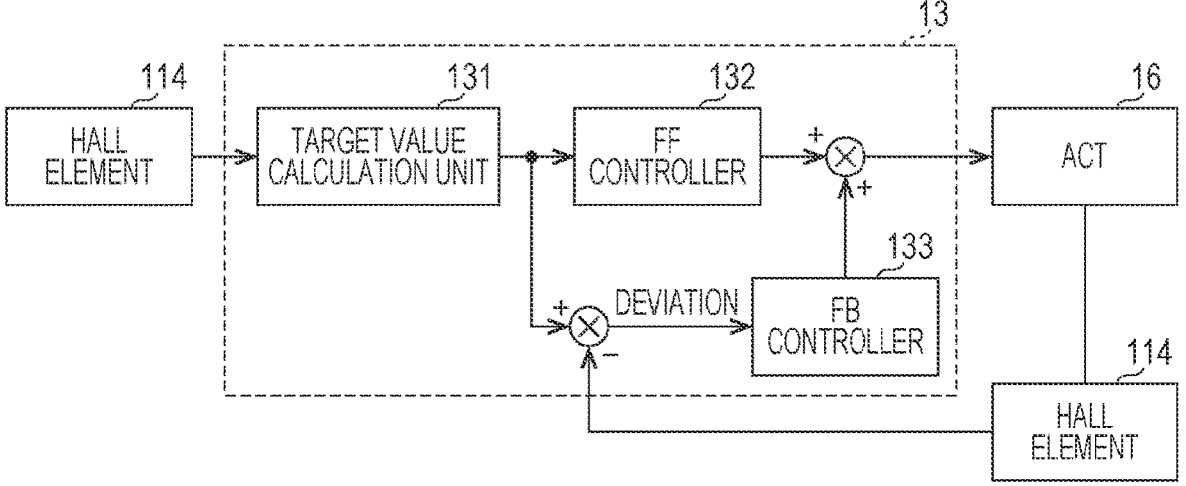
FIG. 22 is a block diagram illustrating a rotational driving control system of a wedge prism in an optical communication device according to a twelfth embodiment of the present invention.

In each of twelfth to fourteenth embodiments to be described below, a form for controlling rotational driving of a wedge prism in an optical communication device in will be described. FIG. 22 is a block diagram illustrating a rotational driving control system of a wedge prism in an optical communication device according to the twelfth embodiment of the present invention. In the present embodiment, the control unit 13 controls the rotational driving of the wedge prism by performing both feedforward control and feedback control.

As illustrated in FIG. 22, in the control unit 13, a target value calculation unit 131 calculates a target value of a rotation angle of the wedge prism 11 according to an output signal from the hall element 114.

A feedforward (FF) controller 132 acquires the target value, and acquires an input value of the actuator (ACT) 16 that provides an intended output.

The input value is corrected by a correction value from a feedback (FB) controller 133, and the actuator 16 is driven according to the corrected input value.

The feedback (FB) controller 133 acquires acquire the above-described correction value by acquiring a deviation of an output signal from the hall element 114 after the actuator 16 is driven according to the corrected input value from the above-described target value.

In general, it is necessary to accurately calculate a rotation angle of the wedge prism for adjusting an optical axis and the like. From this point of view, feedback based on a rotational position of the wedge prism is effective. Meanwhile, a high-speed operation is also required for adjusting an optical axis and the like. From this point of view, if a rotational position of the wedge prism is check, this processing may cause a delay of a control cycle, hindering a high-speed operation for coping with the high-frequency fluctuations described above. The "control cycle" refers to a cycle of a series of control operations related to the rotation control of the wedge prism.

In the present embodiment, as described above, the control system, in which the feedforward control is incorporated into the feedback control, controls the rotational driving of the wedge prism by utilizing the feedback control to correct an error of the feedforward control. Therefore, the present embodiment is advantageous in that accuracy of the rotational driving of the wedge prism is further increased by position calculation, a load of the control by the position calculation is reduced, thereby realizing an improvement in calculation speed. The present embodiment as described above is advantageous when applied to an optical communication device in which both high-speed driving of the wedge prism and position control of the wedge prism, are required, for example, to correct an optical axis of blurred signal light having a high frequency.

Thirteenth Embodiment

Figure 23:
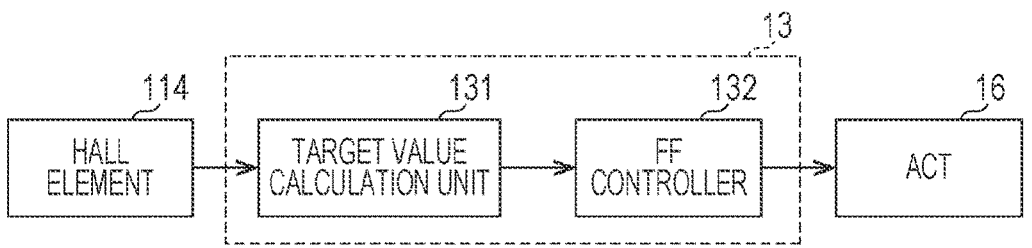
FIG. 23 is a block diagram illustrating a rotational driving control system of a wedge prism in an optical communication device according to a thirteenth embodiment of the present invention.

FIG. 23 is a block diagram illustrating a rotational driving control system of a wedge prism in an optical communication device according to a thirteenth embodiment of the present invention. In the present embodiment, the control unit 13 controls the rotational driving of the wedge prism by performing feedforward control.

As illustrated in FIG. 23, in the control unit 13, a target value calculation unit 131 calculates a target value of a rotation angle of the wedge prism 11 according to an output signal from the hall element 114. A feedforward controller 132 acquires the target value, and acquires an input value of the actuator 16 that provides an intended output. The actuator 16 is driven according to the input value.

As described above, in the present embodiment, the position control of the wedge prism is not included. Therefore, as compared with the above-described twelfth embodiment, a control cycle can be shortened, and a control delay can be further suppressed. Therefore, the present embodiment is much more effective in shortening a rotational motion cycle of the wedge prism, and is more advantageous in coping with the high-frequency atmospheric fluctuations described above. Therefore, the present embodiment is advantageous when applied to an optical communication device in which a correction of a blur of high-frequency signal light is required.

Fourteenth Embodiment

Figure 24:
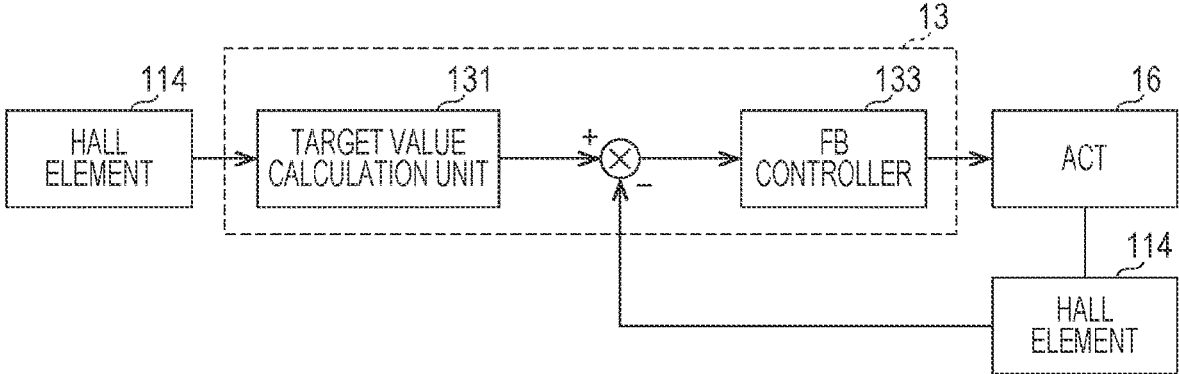
FIG. 24 is a block diagram illustrating a rotational driving control system of a wedge prism in an optical communication device according to a fourteenth embodiment of the present invention.

FIG. 24 is a block diagram illustrating a rotational driving control system of a wedge prism in an optical communication device according to a fourteenth embodiment of the present invention. In the present embodiment, the control unit 13 controls the rotational driving of the wedge prism by performing feedback control.

As illustrated in FIG. 24, in the control unit 13, a target value calculation unit 131 calculates a target value of a rotation angle of the wedge prism 11 according to an output signal from the hall element 114. The target value is corrected based on the output signal from the hall element 114 after the actuator 16 is driven by the corrected input value. The feedback controller 133 acquires the corrected target value, and acquires the input value of the actuator 16. The actuator 16 is driven according to the input value.

As described above, in the present embodiment, the rotational driving of the wedge prism is controlled by position control. Therefore, it is possible to more accurately control a rotational position of the wedge prism as compared with that in the thirteenth embodiment described above. Therefore, the present embodiment is much more effective in that a fluctuation of the signal light is suppressed in a frequency range in which a rotary drive system of the wedge prism in the optical communication device can be realized. The control according to the present embodiment is advantageous when applied to an optical communication device in which it is required to adjust an error of position information generated by installation or when applied to an optical communication device in which it is required to more precisely maintain a reception position of signal light.

According to the tenth to fourteenth embodiments described above (particularly the eleventh to thirteenth embodiments), it is much more effective in that a blur of signal light caused by both vibration of the optical communication device and vibration of the signal light due to atmospheric fluctuations is corrected to realize stable optical communication.

Normally, in optical communication in space, signal light is transmitted with specific energy, and the same is received. The energy for transmitting the signal light is set to be larger than or equal to a minimum energy with which the signal light can reach a light receiving side. However, when there are atmospheric fluctuations as described above, the energy of the signal light changes, and in particular, the energy of the signal light may become smaller than the minimum energy described above due to large atmospheric fluctuations. When the energy of the signal light becomes smaller than the minimum energy, optical communication is interrupted. Therefore, by correcting a blur of the signal light caused by the large atmospheric fluctuations, the signal light is received on the reception side with sufficient energy for reception to stably perform optical communication.

Although small atmospheric fluctuations cause a small energy loss in signal light, the small atmospheric fluctuations result in a high-frequency blur of the signal light, causing a certain blur width of the signal light in optical communication. Therefore, the blur width of the signal light can be further reduced by correcting the blur of the signal light caused by the small atmospheric fluctuations.

As described above, by correcting a blur of signal light caused by large and small atmospheric fluctuations, energy of the signal light in optical communication is maintained within a range of the energy at the time of transmitting the signal light and the above-described reduced blur width. As a high-frequency blur of signal light caused by small atmospheric fluctuations is corrected with higher accuracy, for example, as a higher-frequency blur can be corrected, the above-described blur width is further reduced, and a deviation of energy of the signal light from the energy at the time of transmitting the signal light becomes smaller. As a result, the energy at the time of transmitting the signal light can be set to a value closer to the above-described minimum energy. Therefore, the present embodiment is advantageous in energy saving of optical communication in addition to stabilization of optical communication.

Example of Implementation by Software

The functions of the control unit 13 can be realized by a program for causing a computer to function as the control unit 13, which is a program for causing a computer to function as each control block of the control unit 13.

In this case, the control unit 13 includes a computer having at least one control device (e.g., a processor) and at least one storage device (e.g., a memory), as hardware for executing the program. By executing the program by the control device and the storage device, the functions described in the above embodiments are realized.

The program may be recorded in one or more non-transitory and computer-readable recording media. The above-described device may or may not be provided in the recording medium. In a case whether the above-described device is not provided in the recording medium, the program may be supplied to the above-described device via any wired or wireless transmission medium.

In addition, some or all of the functions of the control blocks can be realized by logic circuits. For example, an integrated circuit in which the logic circuits functioning as the respective control blocks are formed also falls within the scope of the present invention. In addition, for example, the respective functions of the control blocks can be realized by a quantum computer.

Each process described in each of the above-described embodiments may be executed by artificial intelligence (AI). For example, a change cycle, a change amount, and a change direction of an irradiation position in the split photodiode 122 or the light receiving unit 200, and a rotation angle of the wedge prism for canceling the change may be used as learning data to learn a rotation angle of the wedge prism to be acquired and a target value to be applied (a target value to be applied for a difference between a traveling direction of the signal light and a reference direction, a target value for be applied for a difference between an irradiation position of the signal light and a reference position, an order in which these target values are applied, a ratio between these target values, or the like), and a learning result may be reflected in the control of the actuator. In this case, the AI may operate in the control unit 13, or may operate in another device (e.g., an edge computer, a cloud server, or the like).

[Summary]

As is apparent from the above description, an adjustment device (1) according to a first aspect of the present invention includes: a wedge prism (11) rotatably disposed on an optical path of signal light; an actuator that rotates the wedge prism; a detection unit (12) that detects a position of the signal light before being transmitted through the wedge prism or after being transmitted through the wedge prism, the detection unit detecting a difference between a reference position set in the detection unit and the position of the signal light; and a control unit (13) that controls the actuator to reduce the difference detected by the detection unit. According to this configuration, it is possible to realize an adjustment device capable of controlling a traveling direction of signal light at a high speed and with high accuracy, while being advantageous in size reduction.

In the first aspect, in an adjustment device according to a second aspect of the present invention, the actuator may be at least one device selected from the group consisting of a voice coil motor, a DC motor, a stepping motor, and a piezo actuator. This configuration is much more effective in that a rotational motion of the wedge prism is realized at a high speed and with high accuracy.

In the second aspect, in an adjustment device according to a third aspect of the present invention, the actuator may further include a mechanism that transmits operation of the at least one device to the wedge prism to rotate the wedge prism. This configuration is much more effective in that various types of actuators can be applied to the adjustment device.

In the second aspect or the third aspect, in an adjustment device according to a fourth aspect of the present invention, the voice coil motor may include: a magnet fixed to the wedge prism to generate a magnetic field in a direction along a rotation axis of the wedge prism; and a coil fixed to a substrate that rotatably supports the wedge prism, and including a portion extending in a direction intersecting both a rotation direction of the wedge prism and a direction of the magnetic field. This configuration is much more effective in that the size reduction and the weight reduction of the adjustment device are realized.

In the fourth aspect, in an adjustment device according to a fifth aspect of the present invention, the coil may have a fan shape expanding outward from the rotation axis in plan view. This configuration is much more effective in that a loss of rotational thrust of the wedge prism is reduced.

In any one of the second to fifth aspects, an adjustment device according to a sixth aspect of the present invention may further include a hall element for detecting a magnetic flux density of the magnetic field, wherein the control unit may acquire a rotation angle of the wedge prism according to a value of the magnetic flux density detected by the hall element. This configuration is much more effective in that a rotation angle of the wedge prism is obtained quickly and easily.

In any one of the second to sixth aspects, in an adjustment device according to a seventh aspect of the present invention, voice coil motors may be disposed at two or more positions in a rotation direction of one wedge prism. This configuration is much more effective in that the performance stability of the adjustment device is enhanced.

In the seventh aspect, in an adjustment device according to an eighth aspect of the present invention, the plurality of voice coil motors may be each arranged at rotationally symmetrical positions with respect to a rotation axis of the wedge prism in plan view. This configuration is much more effective in that the displacement of the wedge prism in a thrust direction caused by the concentration of the magnetic circuit is suppressed.

In any one of the first to eighth aspects, in an adjustment device according to a ninth aspect of the present invention, the detection unit may include a branching unit disposed on the optical path of the signal light to branch the signal light, and a branched light receiving unit that receives one beam of the branched signal light. This configuration is more effective in that a change in position of the signal light in the light receiving unit is detected regardless of a type of a blur of the signal light.

In the ninth aspect, in an adjustment device according to a tenth aspect of the present invention, the branched light receiving unit may be an image sensor or a split photodiode of which a light receiving surface is split. This configuration is much more effective in that a change in position of the signal light in the light receiving unit is detected regardless of a type of a blur of the signal light.

In any one of the first to eighth aspects, in an adjustment device according to an eleventh aspect of the present invention, the detection unit may be a gyro sensor that detects an inclination of the wedge prism. This configuration is much more effective in that attenuation caused by branching the signal light is suppressed.

An optical communication device according to a twelfth aspect of the present invention includes: the adjustment device according to any one of the first to eleventh aspects; and a light receiving unit that receives the signal light, wherein the wedge prism may be disposed on the optical path of the signal light incident on the light receiving unit.

An optical communication device according to a thirteenth aspect of the present invention includes: the adjustment device according to any one of the first to eleventh aspects; and a light emitting unit that emits the signal light, wherein the wedge prism may be disposed on the optical path of the signal light emitted from the light emitting unit.

In both of the twelfth aspect and the thirteenth aspect, it is possible to realize an optical communication device capable of controlling a traveling direction of signal light at a high speed and with high accuracy, while being advantageous in size reduction.

The present invention is not limited to the above-described embodiments, and various modifications can be made within the scope set forth in the claims. Embodiments obtained by appropriately combining technical means disclosed in the different embodiments also fall within the technical scope of the present invention.

According to the present invention, it is possible to appropriately correct a light receiving position of signal light in the light receiving unit of the optical communication device when slight vibration or the like occurs in the optical communication device, and it is advantageous in further reducing the size of the optical communication device. Accordingly, further contribution to development of information infrastructure and expansion of technological innovation is expected, and contribution to achievement of sustainable development goals (SDGs) regarding the infrastructure of industry and technological innovation is also expected.

What is claimed is:

1. An adjustment device comprising:
   a wedge prism rotatably disposed on an optical path of signal light;
   an actuator that rotates the wedge prism;
   a detection unit that detects a difference between a position of the signal light before being transmitted through the wedge prism or after being transmitted through the wedge prism and a set reference position; and
   a control unit that controls the actuator to reduce the difference detected by the detection unit,
   wherein the detection unit includes a branching unit disposed on the optical path of the signal light to branch the signal light, and a branched light receiving unit that receives light branched from the signal light.

2. The adjustment device according to claim 1, wherein the actuator is at least one device selected from the group consisting of a voice coil motor, a DC motor, a stepping motor, and a piezo actuator.

3. The adjustment device according to claim 2, wherein the actuator further includes a mechanism that transmits operation of the at least one device to the wedge prism to rotate the wedge prism.

4. The adjustment device according to claim 2, wherein the actuator is the voice coil motor, and the voice coil motor includes:
   a magnet fixed to the wedge prism to generate a magnetic field in a direction along a rotation axis of the wedge prism; and
   a coil fixed to a substrate that rotatably supports the wedge prism, and including a portion extending in a direction intersecting both a rotation direction of the wedge prism and a direction of the magnetic field.

5. The adjustment device according to claim 4, wherein the coil has a fan shape expanding outward from the rotation axis in plan view.

6. The adjustment device according to claim 4, further comprising a hall element for detecting a magnetic flux density of the magnetic field,
   wherein the control unit acquires a rotation angle of the wedge prism according to a value of the magnetic flux density detected by the hall element.

7. The adjustment device according to claim 2, wherein the actuator comprises a plurality of the voice coil motors, and the plurality of voice coil motors are disposed at two or more positions in a rotation direction of one wedge prism.

8. The adjustment device according to claim 7, wherein the plurality of voice coil motors are each arranged at rotationally symmetrical positions with respect to a rotation axis of the wedge prism in plan view of the wedge prism.

9. The adjustment device according to claim 1, wherein the branched light receiving unit is an image sensor or a split photodiode of which a light receiving surface is split.

10. The adjustment device according to claim 1, wherein the detection unit is a gyro sensor that detects an inclination of the wedge prism.

11. An optical communication device comprising:
   the adjustment device according to claim 1; and
   a light receiving unit that receives the signal light,
   wherein the wedge prism is disposed on the optical path of the signal light incident on the light receiving unit.

12. An optical communication device comprising:
   the adjustment device according to claim 1; and
   a light emitting unit that emits the signal light,
   wherein the wedge prism is disposed on the optical path of the signal light emitted from the light emitting unit.

13. An adjustment device comprising:
   a wedge prism rotatably disposed on an optical path of signal light;
   an actuator that rotates the wedge prism;
   a detection unit that detects a difference between a position of the signal light before being transmitted through the wedge prism or after being transmitted through the wedge prism and a set reference position; and
   a control unit that controls the actuator to reduce the difference detected by the detection unit,
   wherein the actuator is the voice coil motor, and the voice coil motor includes:
      a magnet fixed to the wedge prism to generate a magnetic field in a direction along a rotation axis of the wedge prism; and
      a coil fixed to a substrate that rotatably supports the wedge prism, and including a portion extending in a direction intersecting both a rotation direction of the wedge prism and a direction of the magnetic field.

* * * * *